(12) United States Patent
Hori

(10) Patent No.: US 8,374,439 B2
(45) Date of Patent: Feb. 12, 2013

(54) IMAGE PROCESSING APPARATUS, IMAGE PROCESSING METHOD, PROGRAM, AND COMPUTER-READABLE PRINT MEDIUM

(75) Inventor: Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 12/485,571

(22) Filed: Jun. 16, 2009

(65) Prior Publication Data

US 2009/0324091 A1  Dec. 31, 2009

(30) Foreign Application Priority Data

Jun. 25, 2008  (JP) .................................. 2008-166254

(51) Int. Cl.
  *G06K 9/68* (2006.01)
  *G06K 9/00* (2006.01)
(52) U.S. Cl. ........................................ 382/218; 382/118
(58) Field of Classification Search .................. 382/118, 382/218, 254, 190
  See application file for complete search history.

(56) References Cited

U.S. PATENT DOCUMENTS

| | | | | |
|---|---|---|---|---|
| 5,218,387 A | 6/1993 | Ueno et al. | ..................... | 351/210 |
| 5,488,429 A | 1/1996 | Kojima et al. | ................ | 348/653 |
| 5,561,474 A | 10/1996 | Kojima et al. | ................ | 348/653 |
| 5,638,136 A | 6/1997 | Kojima et al. | ................ | 348/653 |
| 5,883,699 A * | 3/1999 | Kuramitsu et al. | ............. | 355/40 |
| 6,047,092 A * | 4/2000 | Moro | ........................... | 382/261 |
| 6,885,760 B2 | 4/2005 | Yamada et al. | ............... | 382/118 |
| 6,895,103 B2 | 5/2005 | Chen et al. | ..................... | 381/117 |
| 6,965,684 B2 | 11/2005 | Chen et al. | ..................... | 382/103 |
| 7,103,218 B2 | 9/2006 | Chen et al. | ..................... | 382/170 |
| 7,602,417 B2 | 10/2009 | Ogasawara et al. | | |
| 7,801,436 B2 * | 9/2010 | Kobayashi | ..................... | 396/157 |
| 7,995,239 B2 * | 8/2011 | Yonaha | ........................... | 358/1.9 |
| 8,131,022 B2 * | 3/2012 | Matsuyama | .................. | 382/118 |
| 2001/0036298 A1 | 11/2001 | Yamada et al. | ............... | 382/118 |
| 2002/0081032 A1 | 6/2002 | Chen et al. | ..................... | 382/199 |
| 2003/0016846 A1 | 1/2003 | Chen et al. | ..................... | 382/117 |
| 2004/0208363 A1 * | 10/2004 | Berge et al. | .................... | 382/167 |
| 2005/0243349 A1 * | 11/2005 | Aoyama | ......................... | 358/1.9 |
| 2006/0018517 A1 | 1/2006 | Chen et al. | ..................... | 382/115 |
| 2007/0030375 A1 | 2/2007 | Ogasawara et al. | | |
| 2007/0041640 A1 | 2/2007 | Tabata et al. | .................. | 382/173 |
| 2007/0269082 A1 | 11/2007 | Matsuyama | | |

FOREIGN PATENT DOCUMENTS

| | | |
|---|---|---|
| EP | 0 552 770 A2 | 7/1993 |
| JP | 4-024503 A | 1/1992 |
| JP | 5-197793 A | 8/1993 |
| JP | 06-121332 A | 4/1994 |

(Continued)

*Primary Examiner* — Daniel Mariam
(74) *Attorney, Agent, or Firm* — Fitzpatrick, Cella, Harper & Scinto

(57) ABSTRACT

An image processing apparatus according to the present invention includes an inputting unit for inputting photography information of an image, a judging unit for judging whether or not information of a major subject in the image is stored in the photography information, a detecting unit for detecting the major subject in the image, a comparing unit for comparing an area of the major subject detected by the detecting unit with an area of the major subject stored in the photography information when it is judged by the judging unit that the information of the major subject in the image is stored in the photography information, and a correcting unit for determining an area of the major subject in accordance with the result of the comparison by the comparing unit to make a correction to the area of the major subject.

16 Claims, 16 Drawing Sheets

FOREIGN PATENT DOCUMENTS

| | | |
|---|---|---|
| JP | 08-063597 A | 3/1996 |
| JP | 08-077334 A | 3/1996 |
| JP | 11-053525 A | 2/1999 |
| JP | 11-146405 A | 5/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-044469 A | 2/2002 |
| JP | 2002-183731 A | 6/2002 |
| JP | 2003-030667 A | 1/2003 |
| JP | 2004-207987 A | 7/2004 |
| JP | 2004-303193 A | 10/2004 |
| JP | 2006-279460 A | 10/2006 |
| JP | 2007-068147 A | 3/2007 |
| JP | 2008-028747 A | 2/2008 |
| JP | 2008-109315 A | 5/2008 |
| WO | 2006/025185 A1 | 3/2006 |

* cited by examiner

| | tag No. |
|---|---|
| TITLE | 0x010e |
| MAKER NAME | 0x010f |
| DEVICE KIND | 0x0110 |
| IMAGE DIRECTION | 0x0112 |
| RESOLUTION OF WIDTH | 0x011a |
| RESOLUTION OF HEIGHT | 0x011b |
| RESOLUTION UNIT | 0x0128 |
| SOFTWARE | 0x0131 |
| CHANGE DATA/TIME | 0x0132 |
| WHITE POINT | 0x013e |
| PRIMARY CHROMATICITIES | 0x013f |
| | 0x0211 |
| Y Cr Cb POSITIONING | 0x0213 |
| REFERENCE BLACK WHITE | 0x0214 |
| COPYRIGHT | 0x8298 |
| Exif INFORMATION OFFSET | 0x8769 |

FIG.6

| | tag No. | | tag No. | | tag No. |
|---|---|---|---|---|---|
| EXPOSURE TIME | 0x829a | FLASH | 0x9209 | SENCING METHOD | 0xa217 |
| LENS F VALUE | 0x829d | FOCUS DISTANCE OF LENS | 0x920a | FILE SOURCE | 0xa300 |
| EXPOSURE CONTROL MODE | 0x8822 | CAMERA INTERNAL INFORMATION | 0x927c | SCENE TYPE | 0xa301 |
| ISO SPEED RATINGS | 0x8827 | USER COMMENT | 0x9286 | CFA PATTERN | 0xa302 |
| Exif VERSION | 0x9000 | SUBSEC TIME | 0x9290 | INDIVIDUAL IMAGE PROCESSING | 0xa401 |
| ORIGINAL PHOTOGRAPHY DATE/TIME | 0x9003 | SUBSEC TIME ORIGINAL | 0x9291 | EXPOSURE MODE | 0xa402 |
| DIGITALIZATION DATE/TIME | 0x9004 | SUBSEC TIME DIGITIZED | 0x9292 | WHITE BALANCE | 0xa403 |
| MEANING OF EACH COMPONENT | 0x9101 | FLASH PIX VERSION | 0xa000 | DIGITAL ZOOM MAGNIFICATION | 0xa404 |
| IMAGE COMPRESSION RATE | 0x9102 | COLOR SPACE INFORMATION | 0xa001 | 35 mm CONVERSION LENS FOCUS DISTANCE | 0xa405 |
| SHUTTER SPPED VALUE | 0x9201 | IMAGE WIDTH | 0xa002 | PHOTOGRAPHY SCENE TYPE | 0xa406 |
| APERTURE VALUE | 0x9202 | IMAGE HEIGHT | 0xa003 | GAIN CONTROL | 0xa407 |
| BRIGHTNESS VALUE | 0x9203 | RELATED SOUND FILE | 0xa004 | PHOTOGRAPHY CONTRAST | 0xa408 |
| EXPOSURE CORRECTION AMOUNT | 0x9204 | Exif R98 EXPANSION INFORMATION | 0xa005 | PHOTOGRAPHY CHROMA | 0xa409 |
| RELEASE F VALUE | 0x9205 | FOCAL PLANE X RESOLUTION | 0xa20e | PHOTOGRAPHY SHARPNESS | 0xa40a |
| SUBJECT DISTANCE | 0x9206 | FOCAL PLANE Y RESOLUTION | 0xa20f | PHOTOGRAPHY CONDITION DESCRIPTION INFORMATION | 0xa40b |
| AUTOMATIC EXPOSURE PHOTOMETRIC MODE | 0x9207 | FOCAL PLANE RESOLUTION UNIT | 0xa210 | SUBJECT DISTANCE RANGE | 0xa40c |
| LIGHT SOURCE | 0x9208 | EXPOSURE INDEX | 0xa215 | | |

FIG.7

|  | tag No. |  | tag No. |
|---|---|---|---|
| PHOTOGRAPHY MODE |  | IMAGE SIZE |  |
| PHOTOGRAPHY IMAGE QUALITY |  | PHOTOMETRIC SYSTEM |  |
| FOCUS MODE |  | OPTICAL ZOOM STEP VALUE |  |
| FLASH MODE |  | TITLE |  |
| FLASH STRENGTH |  | FIRMWARE VERSION |  |
| DISTANCE TO SUBJECT |  | FILE NUMBER |  |
| WHITE BALANCE |  | OWNER NAME |  |
| DIGITAL ZOOM |  | CAMERA ID |  |
| SHARPNESS |  | COLOR |  |
| CONTRAST |  | SLOW SYNCHRO |  |
| CHROMA |  | Unknow |  |
| CCD SENSITIVITY |  |  |  |
| MACRO MODE |  |  |  |
| SELF TIMER |  |  |  |
| CONTINUOUSLY PHOTOGRAPHING MODE |  |  |  |

FIG.8

IMAGE PROCESSING APPARATUS, IMAGE PROCESSING METHOD, PROGRAM, AND COMPUTER-READABLE PRINT MEDIUM

BACKGROUND OF THE INVENTION

1. Field of the Invention

The present invention relates to an image processing apparatus, an image processing method, a program and a computer-readable print medium, which appropriately correct an image data, and in particular, to an image processing apparatus, an image processing method, and a print medium, which detect a major subject to correct an image data and once more detect the major subject from the corrected image to make a different image correction.

2. Description of the Related Art

In recent years, it has increased that an input device of an image or an image processing apparatus makes a correction of an image through analysis of the image at inputting or printing the image. Here, the input device is a digital camera for photographing an image, for example. The image processing apparatus is, for example, a printer which receives an image from an input device to print out the image.

Among analysis functions of the image used in the input device or the image processing apparatus, a face detecting function of a person as a major subject in the image has been in the spotlight.

By detecting the face in the image, AF or exposure is controlled to suit to the detected face in the input device and correction control for printing is performed based upon information of the detected face in the image processing apparatus.

Under such a situation, the environment that each of the input device and the image processing apparatus has the face detecting function has begun to be constructed.

Although the function is expressed as the face detecting function by a single phrase, the function has various specifications and features.

For example, in the input device, face detection is performed at the time of inputting an image. Therefore, the face detection in accordance with a video is performed by a face detecting function, and face detecting algorithms and parameters requiring follow-up characteristics or real time characteristics of a face area are adopted therein. Particularly, by detecting the face together with an exposure correction at the time of inputting the image by the input device, the face detecting function in the input device increases the exposure degree in a dark scene or in a backlighting scene, making it possible to more easily detect the face. In reverse, in a bright scene, the face detecting function of the input device decreases the exposure degree to detect the face. In this way, the face can be detected by changing the input image dynamically.

According to the face detecting function in the input device, a face is detected to limit a detection orientation of the face to a camera photographing orientation by a combination of an acceleration sensor or an angle sensor, thereby making it possible to shorten the detection time.

According to the face detecting function in the input device, a user performs focus, image angle and pint adjustments while looking at the face detection result displayed on a finder or liquid crystal. Therefore, sufficient image detection performance can be maintained with the image detecting technology having not so much high accuracy.

According to the face detecting function in the input device, a user can determine an erroneous detection on the spot. Therefore, it has an advantage of being capable of reducing the final erroneous detections in number.

Further, according to the face detecting function in the input device, range information, a focus point and the like of a subject can be observed immediately. Therefore, these pieces of the information are feed-backed to the face detection, thereby making it possible also to enhance the face detection performance as a whole.

On the other hand, according to the face detecting function in the image processing apparatus, which is different from the face detecting function in the input device, the face detection is generally performed from one sheet of a still image data and therefore, real time characteristics are not required. Since in the face detecting function in the image processing apparatus, all pieces of the information at taking the focus in the input device can not be used, the image processing apparatus has a tendency of taking more time for performing the face detection.

Therefore, information of a tag in an Exif (Exchangeable Image File Format) file in which various pieces of control information in the input device at the time of inputting the image are described is used to control parameters of the face detecting function in the image processing apparatus.

The most remarkable feature of the face detecting function in the image processing apparatus lies in a point that, since the real time characteristics are not required, the face detection can be performed in the middle of finely changing a orientation of the face detection or a size of the face.

In the face detecting function in the input device, it is sufficient only to detect a rough position of the face, but in the face detection function in the image processing apparatus, it is easy to detect a position, a size, a orientation and the like of the face in more detail. Further, if the face information is processed by a PC (Personal Computer) or the like, the face detection can be more accurately performed by the face detecting function in the input device than by the face detecting function in the image processing apparatus.

Japanese Patent Laid-Open No. 2004-207987 discloses the invention in which an image processing apparatus receives a photography image data storing face coordinates detected at the time of photographing an image by an input device as a part of information of an Exif file and the printing is carried out by making the image correction by using the face coordinates.

In addition, according to the input device, in a case of placing importance on real time characteristics, the face detection function may be performed while giving feedback of the face detection at a video, and sensor information other than the face detection.

However, the face detecting function in the image processing apparatus is generally more excellent in view of face detection accuracy than in the input device. Particularly the detection accuracy of the information such as a size or an inclination of the face is high.

Further, since a time lag occurs from a point of performing face detection until a point of actually taking a photo in the input device, a face area at detecting may differ from that of a face detection result on the photographed image data due to movement of a person as a subject, movement of a cameraman and the like.

FIG. 16 shows an example where a face area in a case of face detection at photographing by the input device is shifted from a face area in a case of face detection by an image data which the image processing apparatus receives from the input device. An image 1601 shows a face position at photographing by the input device, that is, at the time of performing face detection by the input device in a state where a user pushes a shutter to a half position. A face area 1602 at this point is expressed by coordinates of four points of left top (LT), left bottom (LB), right top (RT) and right bottom (RB).

An image 1603 shows an example where, when a user fully pushes a shutter in the input device for taking a photo, the photographed image data is inclined by rotation of the input device or the like. A face area 1604 at this point is expressed by coordinates of four points of left top (LT'), left bottom (LB'), right top (RT') and right bottom (RB').

An image 1605 shows an example where, when a user fully pushes a shutter in the input device for taking a photo, a subject moves right in the facing orientation. At this point, a face area 1606 is expressed by coordinates of four points of left top (LT"), left bottom (LB' right top (RT") and right bottom (RB").

As described above, there occurs a case where the coordinates of the face area 1602 detected by the input device are different from the coordinates of the face areas 1604 and 1606 detected by the image processing apparatus after the photographing by the input device.

In a case where the face area detected by the input device is different from the face area on the image data detected by the image processing apparatus to produce the position shift from each other, it raises the problem that the subsequent processing is executed based upon information of the erroneous face area in the image processing apparatus.

Particularly in a case of making a local correction using the detection result of the face area, the correction result of the image including the face area may not be appropriate due to this detection error (position shift).

The present invention is made in view of the foregoing problem and an object of the present invention is to provide an image processing apparatus which, when a position shift occurs in a detection position of a major subject in an image such as a face area, can appropriately make a correction of the position shift.

SUMMARY OF THE INVENTION

For solving the above problem, an image processing apparatus according to the present invention comprises an inputting unit for inputting photography information of an image, a judging unit for judging whether or not information of a major subject in the image is stored in the photography information, a detecting unit for detecting the major subject in the image, a comparing unit for comparing an area of the major subject detected by the detecting unit with an area of the major subject stored in the photography information when it is judged by the judging unit that the information of the major subject in the image is stored in the photography information, and a correcting unit for determining an area of the major subject in accordance with the result of the comparison by the comparing unit to make a correction to the area of the major subject.

As explained above, according to the present invention, in a case where the position shift occurs in the detection position of the major subject in the image, the correction to the position shift can be appropriately made.

Further features of the present invention will become apparent from the following description of exemplary embodiments (with reference to the attached drawings).

BRIEF DESCRIPTION OF THE DRAWINGS

FIG. 6 is a diagram showing an example of main information items in the Exif file;
FIG. 7 is a diagram showing an example of sub information items in the Exif file;
FIG. 8 is a diagram showing an example of maker original information items in the Exif file.

DESCRIPTION OF THE EMBODIMENTS

First Embodiment

Figure 1:
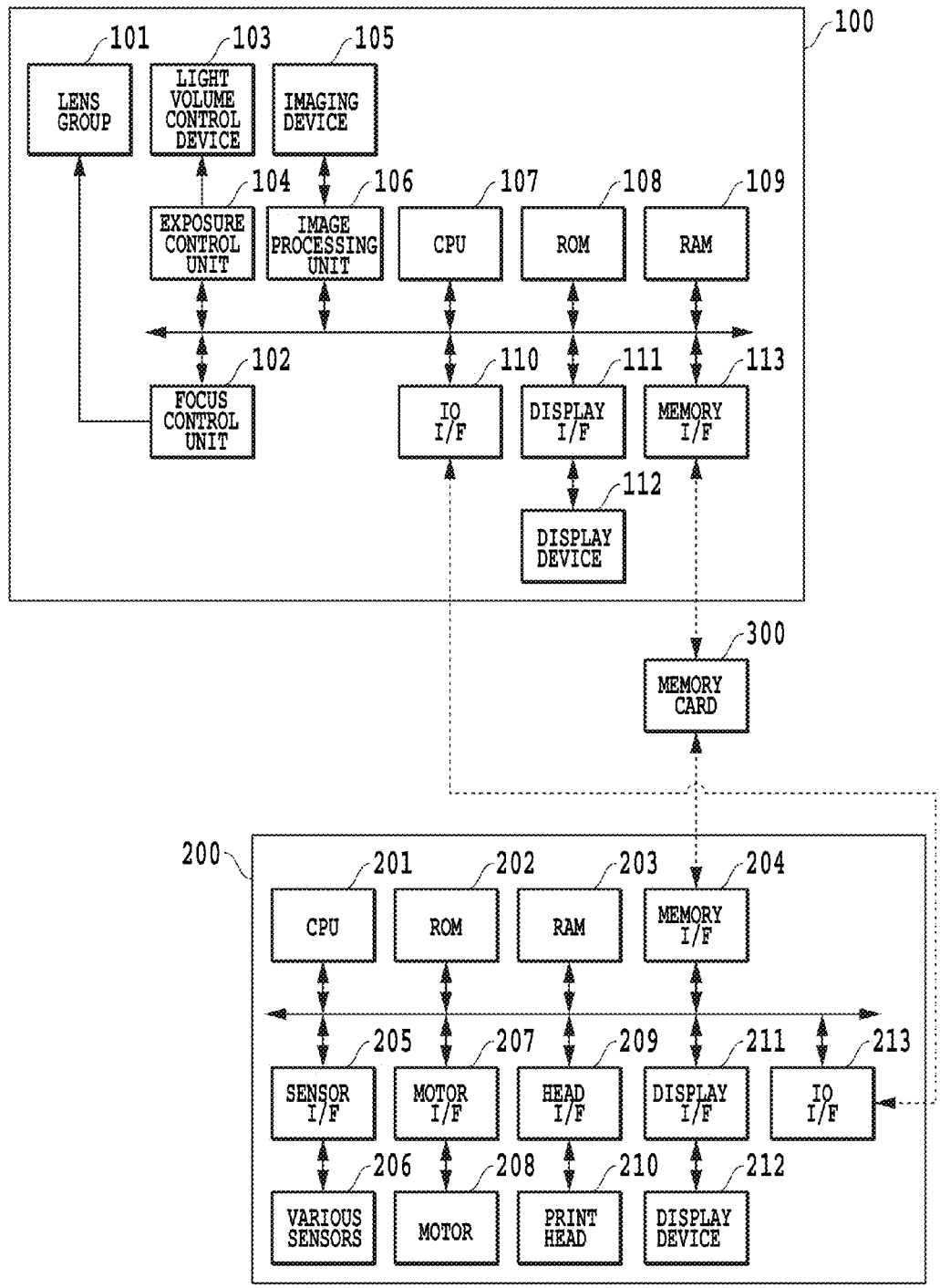
FIG. 1 is a block diagram of a system according to a first embodiment.

FIG. 1 is a schematic block diagram of a system according to a first embodiment in the present invention.

The system shown in FIG. 1 includes an input device 100 and an image processing apparatus 200.

Here, the input device 100 may be a digital camera, for example. The image processing apparatus 200 may be a printer, for example.

First, the input device 100 will be explained hereinafter.

An image data photographed by the input device 100 is transferred by a memory card 300 or by connecting an I/O I/F (interface) 110, 213 through a cable or a wireless LAN.

A light volume control device 103 is provided with an aperture and a shutter device.

An imaging device 105 is, for example, a CCD (Charge Coupled Device) or a CMOS (Complementary Metal Oxide Semiconductor) sensor. Here, the imaging device 105 converts light flux as a subject image passing through a lens group 101 and the light volume control device 103 into an electrical signal. In the imaging device 105, clamp processing or gain processing is executed to output of an analog signal of the CCD or the CMOS sensor, for example. After performing analog/digital (A/D) conversion for converting the analog signal into a digital signal, pixel interpolation processing or color conversion processing is executed to the digital signal, which is outputted as a photography data.

A focus control unit 102 controls the lens group 101 in response to AF (Auto Focus) processing of a TTL (Through The Lens) system.

An exposure control unit 104 controls the light volume control device 103 by executing AWB (Auto White Balance) processing of the TTL system.

The I/O I/F 110 provides input/output functions of the input device 100, and provides connection functions to operation buttons and external devices such as a USB (Universal Serial Bus) and a wireless LAN (Local Area Network).

The operation buttons including buttons such as a power source, a mode switching and a shutter, or input unit capable of setting various functions receives input from a user to arbitrarily control the input device 100 for the operating.

A display I/F 111 performs control of a display device 112 displaying a preview of the photographed image, an operation menu and the like.

A display device such as a liquid crystal display is used in the display device 112.

A CPU (Central Processing Unit) 107 performs control of the input device 100 while executing programs stored in a ROM (Read Only Memory) 108. At this time, the CPU 107 uses a RAM (Random Access Memory) 109 for storing data temporarily required.

A memory I/F 113 has a connector of a memory card 300 provided with an involatile memory function therein, such as a CF (Compact Flash) memory card or a SD (Secure Digital) memory card. Further, the memory I/F 113 also has a function of controlling the reading and writing of data.

Particularly when the photographed image data is stored in the memory card 300, the photographed image data continues to be stored even in a state where the power source of the input device 100 switches off, and the photographed image data can be used by reading out the memory card 300 by another device.

An image processing unit 106 performs detection of a major subject from image information converted into the digital data at the imaging device 105.

It should be noted that the detecting unit for the major subject may include plural ones. In this case, the plural detecting units for the major subject may be called "first detecting unit for the major subject" and "second detecting unit for the major subject".

In the present embodiment, a major subject of an input image is explained as a face of a person, as an example.

Upon detecting a face of a person, as shown in Japanese Patent Laid-Open No. 2002-183731, first, an eye area may be detected from an input image to define the periphery of the eye area as a face candidate area.

A bright grade of each pixel and weight of the bright grade in the face candidate area may be calculated, which will be compared with a grade of an ideal face reference image in advance set and weight of the grade.

As a result, in a case where an average angle between the respective grades is less than a predetermined threshold value, it may be judged that the input image has the face area.

As shown in Japanese Patent Laid-Open No. 2003-30667, first, a Flesh color area is detected from the image and a rainbow coloration pixel of a person is detected in the same area. Thereby, a position of the eye may be detected.

As shown in Japanese Patent Laid-Open No. H8-63597 (1996), a matching degree between a template formed in a plural-face shape and an image may be calculated.

As a result, if the template in which the matching degree is the highest is selected and the highest matching degree is more than a threshold value in advance defined, an area in the selected template may be defined as a face candidate area.

By using the same template, the position of the eye may be detected.

As shown in Japanese Patent Laid-Open No. 2000-105829, first, a nose image pattern is made to a template, and the entire image or an area designated in the image is scanned. As a result, the most matching position may be outputted as a position of a nose.

Next, an area above the position of the nose in the image is defined as an area where the eye exists, and an eye image pattern is made to a template to scan the eye existence area for the matching. As a result, an eye existence candidate position collection, which is a collection of pixels each having a matching degree larger than a threshold value, may be found.

Further, continuous areas included in the eye existence candidate position collection may be divided into clusters, and a distance between each cluster and a nose position may be calculated. The cluster having the shortest distance among the above distances may be determined as a cluster in which the eye exists, thereby performing detection of the organ position.

Other examples of the method of detecting the face position and the organ position may include methods shown in Japanese Patent Laid-Open No. H8-77334 (1996), Japanese Patent Laid-Open No. 2001-216515, Japanese Patent Laid-Open No. H5-197793 (1993), Japanese Patent Laid-Open No. H11-53525 (1999), Japanese Patent Laid-Open No. 2000-132688, Japanese Patent Laid-Open No. 2000-235648, Japanese Patent Laid-Open No. H11-250267 (1999), and Japanese Patent Laid-Open No. H4-24503 (1992).

The method of detecting the face position and the organ position used in the present embodiment is not limited to the aforementioned methods, but any other method may be used. It should be noted that in regard to the detection of the face position and the organ position, the conventional methods thereof are disclosed in various documents and therefore, a detailed explanation thereof is omitted.

Next, the image processing apparatus 200 in FIG. 1 will be explained hereinafter.

Likewise in the image processing apparatus 200 in FIG. 1, a CPU (Central Processing Unit) 201 controls each function to be described later while executing programs stored in a ROM (Read Only Memory) 202.

At this time, data temporarily required are stored in a RAM (Random Access Memory) 203.

A sensor I/F 205 provides an interface function of various sensors 206 used in the image processing apparatus 200.

The various sensors 206 include, for example, a sheet feeding sensor for measuring a carrying amount of a print sheet, a head position sensor for measuring a position of a print head and an ink residual amount detecting sensor.

A motor I/F 207 provides an interface function of various motors 208 used in the image processing apparatus 200.

The motors 208 include, for example, a carrying motor for carrying the print sheet and a head motor for moving the print head.

A head I/F 209 provides an interface function of the print head 210 used in the image processing apparatus 200.

The print head is provided with plural nozzles arranged therein for discharging ink in every ink color, where a discharge pattern of the ink is controlled, thereby forming a print image on a print sheet.

The I/O I/F 213 provides input/output functions of the image processing apparatus 200, and provides connection functions to operation buttons and external devices such as a USB and a wireless LAN.

The operation buttons including various buttons for a power source, printing, copying and the like, and input unit capable of setting various functions are provided. Based upon them, a user can arbitrarily control the image processing apparatus 200 for the operating.

A memory I/F 204 provides the same function as the memory I/F 113 in the input device 100, and is, as a main use method, used to read an image data photographed at the input device 100 for the printing.

Figure 2:
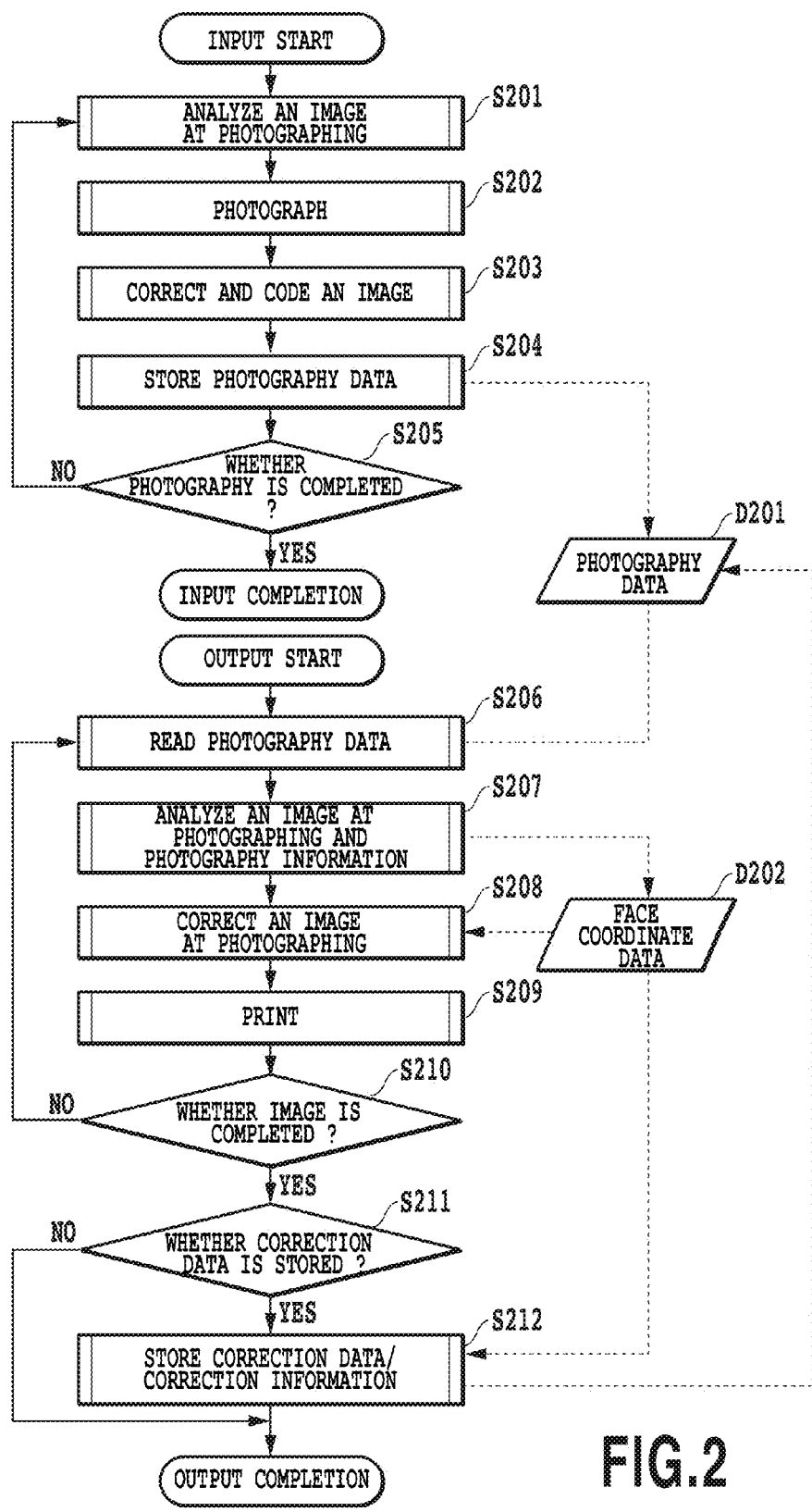
FIG. 2 is a flow chart of the processing executed in the system in FIG. 1.

FIG. 2 shows a flow of a typical operation of the system explained in FIG. 1.

The explanation of the operation in FIG. 2 assumes, as the typical operation, an operation that a user photographs an image at the input device 100 in FIG. 1 and the image processing apparatus 200 reads and prints the data.

First, at step S201 the input device 100 operates to adjust a photography condition such as focus or exposure of a subject as a photography object in the input device 100.

At this time, the input device 100 performs face detection of a person as one function for analysis of an image formed at the imaging device 105 in the image processing unit 106 before photographing.

Thereafter, for example, focus adjustment, exposure adjustment and adjustment of a shutter speed suitable for a face of a person as a major subject are automatically carried out by a person priority mode of the input device 100.

Figure 3:
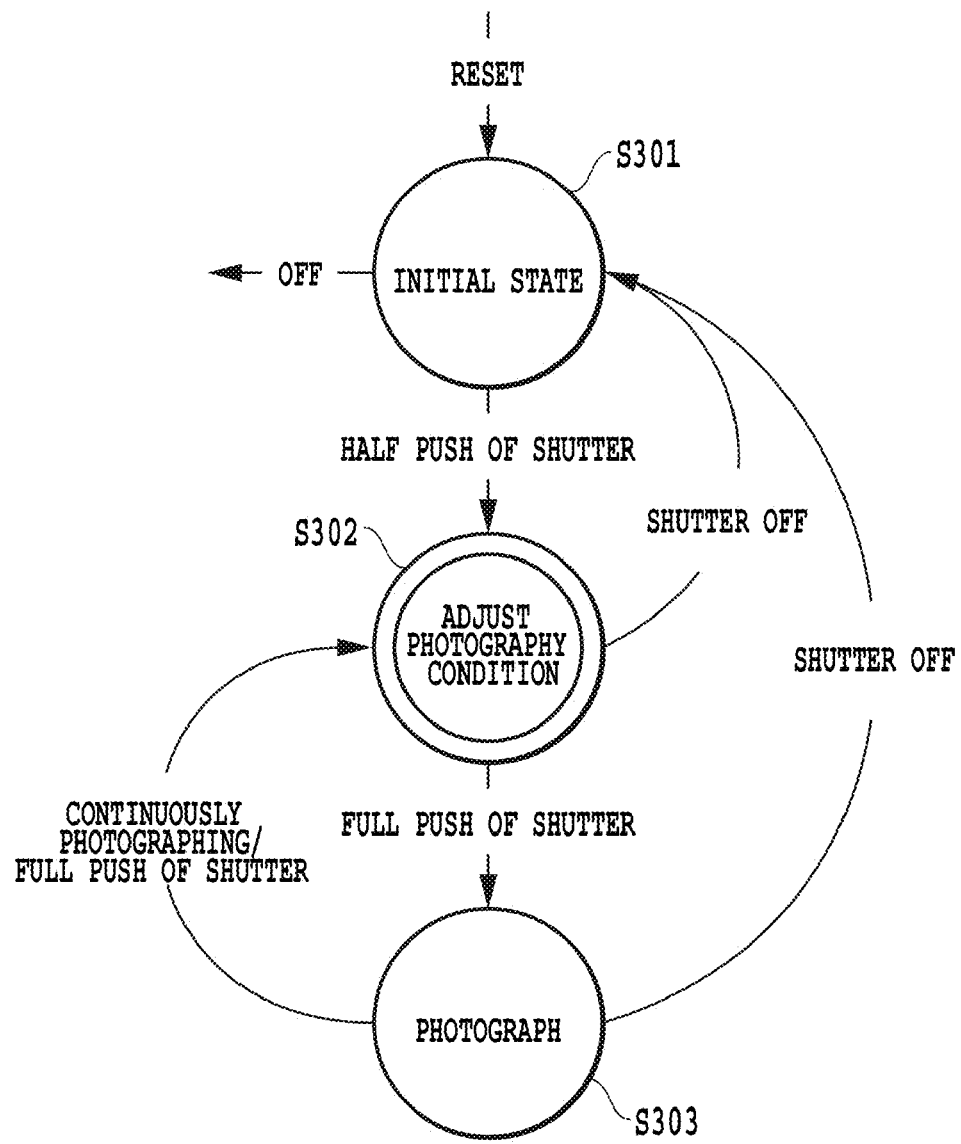
FIG. 3 is a state transition diagram at the time of analyzing a photography image of an input device.

FIG. 3 shows a state transition when an image analysis at photographing to be carried out at step S201 is made in the input device 100.

First, when the power switches on or when the photography mode sets in, the state transition is reset to be transferred to step S301 as an initial state.

Next, when the shutter button is in a half-pushed state, the state transition transfers to step S302 where the photography condition adjustment is carried out.

When the shutter button becomes in a fully-pushed state in a state which has transferred to step S302 where the photography condition adjustment is carried out, the state transfers to step S303 where the photography is performed.

Step S303 where the photography is performed corresponds to step S202 where the photography in FIG. 2 is performed, step S203 where correction/coding of an image is performed, and step S204 where storage of a photography data is performed.

In a case where a continuously photographing mode is selected in a state of step S303 where the photography in FIG. 3 is performed or in a case where the shutter button continues to be in a fully-pushed state for more than a predetermined time, the state goes back to step S302 where the photography condition adjustment is once more performed, wherein the photography condition is adjusted.

In a case where the shutter button switches off at step S302 where the photography condition adjustment is performed and at step S303 where the photography is performed, the state goes back to step S301 in the initial state and is in a standby state for the next operation.

Figure 4:
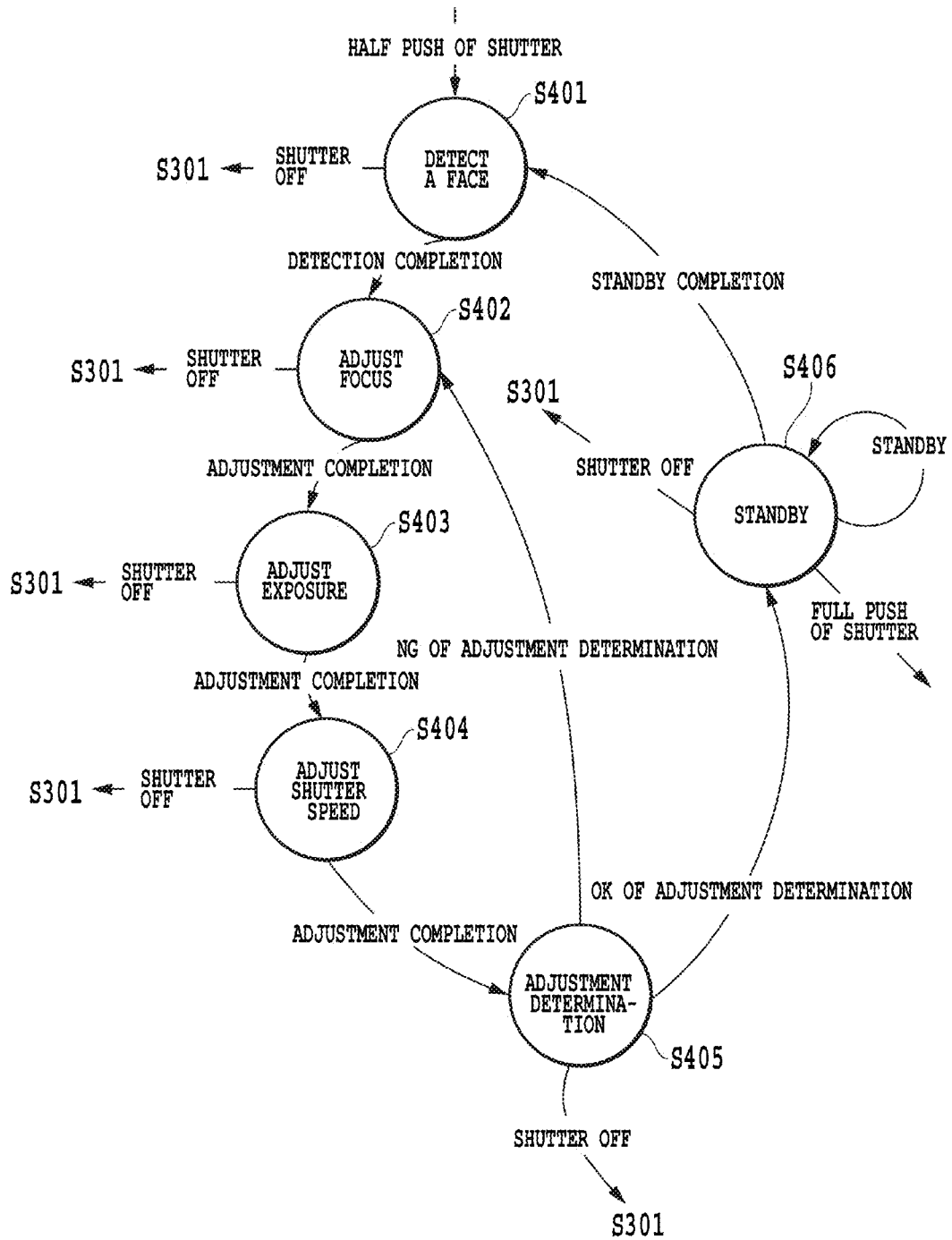
FIG. 4 is a state transition diagram of a photography condition adjustment of the input device.

FIG. 4 shows a detail of step S302 in FIG. 3 where the photography condition adjustment is performed. By referring to FIG. 4, a determination process of the photography condition at the person priority mode will be explained as an example.

In a case where the input device 100 performs the photography at the person priority mode, the state at step S302 where the photography condition adjustment is performed transfers to step S401 where at first a face detection is performed, wherein the face detection is performed.

Next, regardless of whether or not the face is detected at step S401, the state transfers to step S402 where the focus adjustment is performed, provided with the face detection result.

At step S402 where the focus adjustment is performed, in a case where the face is detected as the face detection result, the focus control unit 102 in FIG. 1 controls the lens group 101 in such a manner as to suit the focus to the position.

At step S402, in a case where the face is not detected as the face detection result, the lens group 101 executes the focus processing by the AF processing of the TTL system. When step S402 where the focus adjustment is performed is completed, the state transfers to step S403 where the next exposure adjustment is performed.

At step S403 where the exposure adjustment is performed, in a case where the face is detected, the AWB adjustment prioritizing the face is performed. On the other hand, at step S403 where the exposure adjustment is performed, in a case where the face is not detected, the exposure control unit 104 in FIG. 1 operates the light volume control device 103 by the regular AWB processing of the TTL system.

When step S403 where the exposure adjustment is performed is completed, the state transfers to step S404 where the shutter speed adjustment is performed.

At step S404 where the shutter speed adjustment is performed, the most appropriate shutter speed is calculated subjected to the adjustment results at step S402 where the focus adjustment is performed and at step S403 where the exposure adjustment is performed. Light receiving time of the light flux of the imaging device 105 in FIG. 1 is determined by the calculated shutter speed.

When step S404 where the shutter speed adjustment is performed is completed, the state transfers to step S405 where an adjustment judgment is made.

At step S405 where the adjustment judgment is made, the judgment on the entire photography condition is made. When a result of the adjustment judgment is OK (appropriate), the state transfers to step S406 where standby processing is executed.

When the result of the adjustment judgment is NG (inappropriate) at step S405, the state transfers to step S402 where the focus adjustment is performed, wherein the adjustment of the photography condition is once more performed.

At step S406 where the standby processing is performed, in a case where the shutter button becomes in a fully-pushed state by the time a predetermined time elapses, the state transfers to step S303 in FIG. 3 where the photography is performed. On the other hand, when the standby (standby state of the predetermined time) elapses at step S406, the state once more transfers to step S401 where the face detection is performed, wherein the adjustment of the photography condition is re-performed.

In a case where the shutter button switches off in the midway of all the states in FIG. 4, the state transfers to step S301 in FIG. 3 in the initial state.

When the photography is performed in the person priority mode, at step S202 in FIG. 2 the light flux as the subject image is converted into an electrical signal by the imaging device 105. The electrical signal is made to a photography data with clamp processing, gain processing, digital conversion processing, pixel interpolation processing and color conversion processing, which is stored in the RAM 109.

A print method of the photography data stored in the RAM 109 is explained using an "Exif" file format (Ver. 2.2) as a representative image file format used generally in the market.

Figure 5:
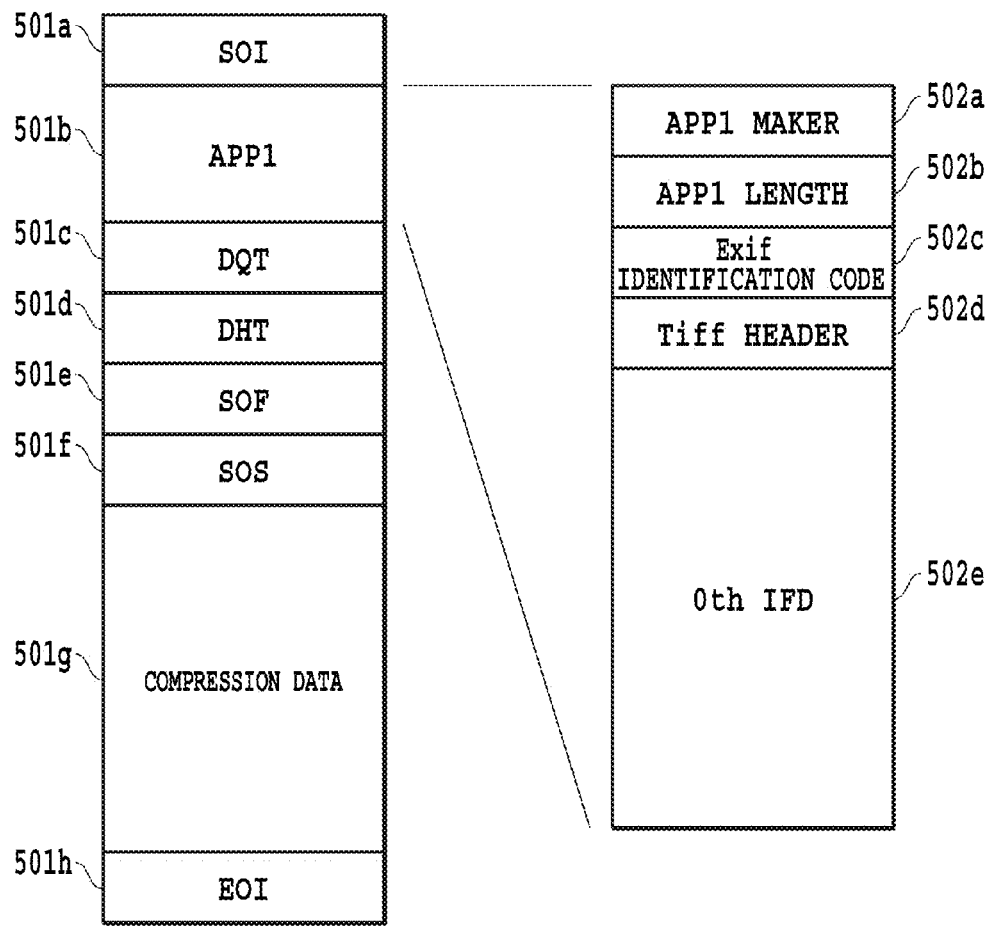
FIG. 5 is a diagram showing a data structure in an Exif file.

FIG. 5 is a diagram showing a data structure of the Exif file.

The structure of the Exif file is basically exactly the same as a format of a regular JPEG file in which data of a thumbnail image, photography-related data and the like are embedded in compliance with terms in the JPEG.

Using an internet browser, an image viewer, photo retouching software or the like supporting the format of the JPEG, the Exif file can be available for browsing in the same way as the regular JPEG file.

The Exif file includes, at first, SOI (Start Of Image/ 0xFFD8) 501*a* as shown in a left side in FIG. 5.

Further, the Exif file includes APPI (501*b*), DQT (Define Quantization Table) 501*c* and DHT (Define Huffman Table) 501*d* after SOT 501*a*.

The Exif file further includes SOF (Start Of Frame) 501*e*, SOS (Start Of Stream) 501*f*, compression data (DATA) 501*g*, and EOI (End Of Image) 501*h* after DHI 501*d*.

In the Exif file, DQT 501*c* defines an actual state of a quantization table and DHT 501*d* defines an actual state of a Huffman table. In the Exif file, SOF 501*e* shows a start of a frame, SOS 501*f* shows a start of an image data and EOI 501*h* shows completion of an image file.

Among makers used in the Exif file, the markers from 0xFFE0 to 0xFFEF are called application markers, which are not required for decoding the Exif file.

However, the application marker defines the Exif file as a data area for use at each application program.

In the Exif file, a marker called APP1 (0xFFE1) is used for storing a photography condition, for example.

A structure of "APP1" is shown in a right side in FIG. 5.

In the structure of "APP1", at first, APP1 Maker (0xFFE ½ bytes) 502*a* is at the head, APP1 Length (a magnitude of an APPI area having 2 bytes) 502*b* is at the next thereof. In addition, Exif identification code 502*c* as a data area of APPI is at the next thereof.

In the first 6-byte of the data subsequent to the Exif identification code 502*c*, "Exif" of an ASCII letter as an identifier is put. Next, 0x00 of 2 bytes follows. Further, next, data are stored in a Tiff (Tagged Image File Format) format.

The first 8-byte in the Tiff format becomes Tiff Header 502*d* and the first 2-byte defines a format of a byte arrangement.

For example, 0x4d4d: "MM" shows a Motorola format and 0x4848: "II" shows an Intel format.

The first IFFD (Image File Directory) is stored in $0^{th}$ IFD (IFD of main image) 502*e* next to Tiff Header 502*d*.

Main image data and image-related data are usually stored in IFFD and the description matter therein is classified into main information items, sub information items (Exif SubIFD/ 0x8768), and maker original information items (Maker note/ 0x827c) for each description item.

FIG. 6 shows an example of the main information items in the Exif file.

As shown in FIG. 6, general information such as a tile, a maker name and a machine kind of the input device 100, an image orientation, resolution of width, resolution of height, resolution unit, software and a change date/time is described as the main information items. In FIG. 6, as an example, a "tag" address (tag No.) is described to each item. For example, in FIG. 6, a tag No. in an "title" item is "0x010e".

FIG. 7 shows an example of the sub information items in the Exif file.

As shown in FIG. 7, detailed information of the input device 100, such as a light source and a lens focus distance, and various photography conditions, such as an exposure time F value, ISO sensitivity and an automatic exposure photometric mode are described as the sub information items. In FIG. 7, as an example, a "tag" address (tag No.) is described to each item. For example, in FIG. 7, a tag No. in an "exposure time" item is "0x829a".

FIG. 8 shows an example of the maker original information items in the Exif file.

The maker original information items shown in FIG. 8 are set independently for each maker in the input device 100. Accordingly, in the maker original information items in FIG. 8, for example, photography-related data not defined in the sub information items in FIG. 7 may be described together with the tag No.

In the present embodiment, as an example, the face detection result by the input device 100 is stored in the maker original information items in FIG. 8. Here, the face detection result includes parameters used for face detection.

Figure 9:
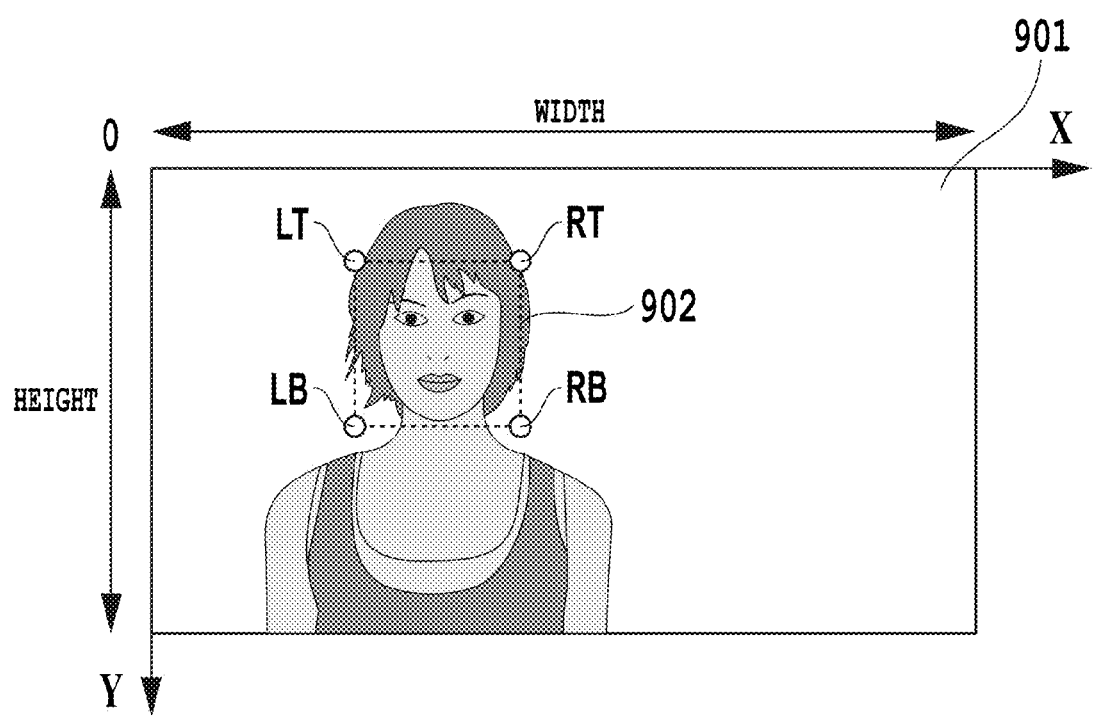
FIG. 9 is a diagram showing an example in detection of a major subject (face)

The face detection result is expressed as a position relation as shown in FIG. 9. An area 901 shows an image part of the general photography data D201 in FIG. 2 and includes image data when photographed.

The area 901 in FIG. 9 includes pixels of a predetermined width and a predetermined height where a person is photographed and shows a state where a face is detected by the face detection function.

In FIG. 9, X shows a lateral axis and Y shows a longitudinal axis, and a left top in the image is an origin (0, 0) of coordinates.

In FIG. 9, the face of the person is expressed as placed in the area 902.

In the present embodiment, as shown in FIG. 9, a face area is defined as an area surrounded by coordinates of four points of left top (LT), right top (RT), left bottom (LB), and right bottom (RB). The four points each can be expressed by two-dimensional coordinates of "x and y".

For expression of the face area, besides, an expression method such as center and magnitude or central point, width and height may be adopted.

Further, by allotting an ID number to each face area for management, plural face detections can be performed.

The photography data D201 stored in the Exif file format at step S203 in FIG. 2 is next stored through the I/F 113 in the memory card 300 at step S204.

Next, at step S205 it is judged whether or not the photography by the input device 100 is completed. When it is judged at step S205 that the photography by the input device 100 is completed, the input of the image is completed. On the other hand, when it is judged at step S205 that the photography by the input device 100 is not completed, the process goes back to step S201.

When the memory card 300 in which the photography data D201 is stored is inserted into the memory card I/F 204 in the image processing apparatus 200, the photography data D201 is usable at the image processing apparatus 200.

Next, at step S206 the image processing apparatus 200 reads the photography data D201 stored in the memory card 300.

At this time, a UI (User Interface) prompting an operation of a user is displayed on the display device 212 in the image processing apparatus 200. This UI receives, for example, a selection operation of an image by the button connected to the I/O I/F 213. Here, the display device 212 is connected to the display I/F 211.

Further, at step S206 it is performed also to set conditions required for the printing, such as selection of a sheet to be printed, print quality and an image correction function.

Here, the image correction function includes a function of automatically correcting the entire image to the most appropriate image, a function of making a red-eye correction and a function of correcting only a portion of a face.

Figure 10:
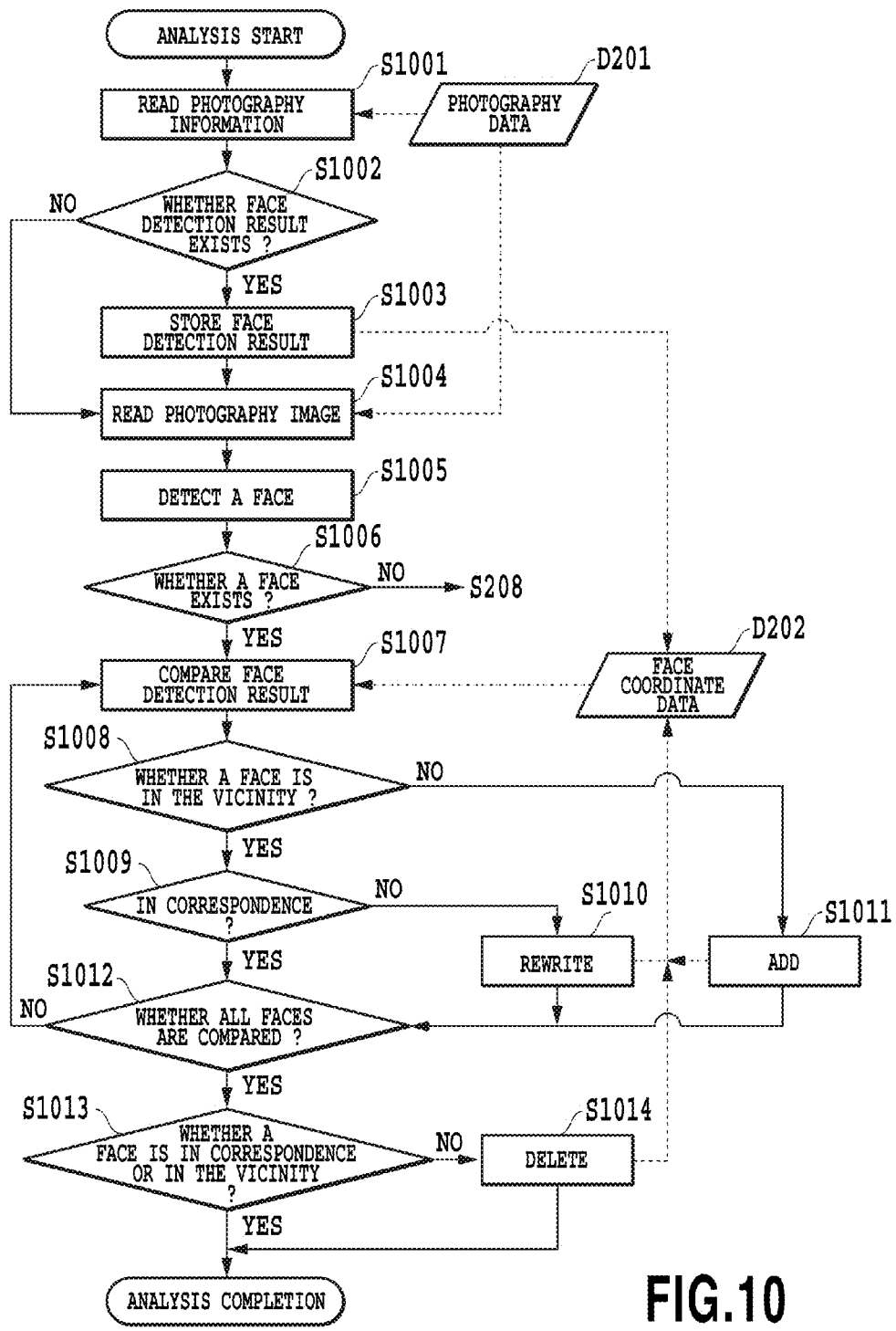
FIG. 10 is a flow chart at the time of analyzing a photography image in an image processing apparatus.

Next, the images selected at step S206 are analyzed one by one at step S207. Hereinafter, an operation of step S207 will be explained with reference to FIG. 10. FIG. 10 is a flow chart carried out in the image processing apparatus 200. The CPU 201 reads out and executes a program stored in the ROM 202 or the RAM 203 for executing the processing in FIG. 10, thereby carrying out the flow chart in FIG. 10.

The image selected at the display device 212 in the image processing apparatus 200 is included in the photography data D201 and has the data structure of the Exif file in FIG. 5. First, at step S1001 in FIG. 10 the analysis of the Exif file included in the photography data D201 is carried out.

Next, at step S1001 the photography information of the image by the input device 100 including the maker original information items in the Exif file included in the photography data D201 is read in.

Next, at step S1002 it is judged whether or not the face detection result by the input device 100 is stored in the maker original information items of the Exif file included in the photography information. When it is judged at step S1002 that the face detection result by the input device 100 is stored in the maker original information items of the Exif file included in the photography data D201, the process goes to step S1003.

On the other hand, When it is judged at step S1002 that the face detection result by the input device 100 is not stored in the maker original information items of the Exif file included in the photography data D201, the process goes to step S1004.

At step S1003 the face detection result by the input device 100 stored in the photography data D201 is stored in a storage area of a face coordinate data D202 of the RAM 203 in the image processing apparatus 200.

After all the face detection results by the input device 100 in the photography data D201 are stored in the RAM 203 in the image processing apparatus 200 at step S1003, the process goes to step S1004.

At step S1004, a compression data 501g of the image data in the photography data D201, DGT 501c and DHT 501d are read and the image data which is photographed by the input device 100 and compressed in the format of the JPEG file is decoded. The analyzable image data photographed by the input device 100 can be obtained.

The image data decoded at step S1004 is stored in a storage area in a decode image of the RAM 203 in the image processing apparatus 200.

Next, at step S1005 the face detection processing by the face processing device 200 is executed to the image data stored in the RAM 203 in the image processing apparatus 200 at step S1004.

At step S1005, if the face detection result by the input device 100 stored at step S1003 exists, control of the face detection processing by the image processing apparatus 200 may be executed based upon the face detection result.

For example, at step S1005 the face detection may be performed with emphasis on the vicinity of the face detected in the input device 100 by the image processing apparatus 200.

In addition, at step S1005 the same face detection algorithm as the face detection algorithm used in the face detection processing executed in the input device 100 may be adopted in the face detection processing by the image processing apparatus 200.

In the face detection processing in the image processing apparatus 200, however, the real time characteristics are not required. Therefore, the processing time of the face detection processing in the image processing apparatus 200 may be longer than the processing time of the face detection processing in the input device 100.

However, since a detection object in the face detection processing in the image processing apparatus 200 is a static image after photography, an algorithm of moving-body detection by a difference amount between frames, which is usable in a dynamic image, can not be adopted at the face detection processing in the image processing apparatus 200.

However, an algorithm having a different detection performance may be adopted in the face detection processing in the image processing apparatus 200 in such a manner as to increase accuracy of a face detector in use, reduce a step of detection movement of the face detector or accurately detect an orientation and an inclination of a face.

Hereinafter, it will be explained how different the result of the face detection processing by the input device 100 is from the result of the face detection processing by the image processing apparatus 200 as an example with reference to FIGS. 11 to 13.

Figure 11:
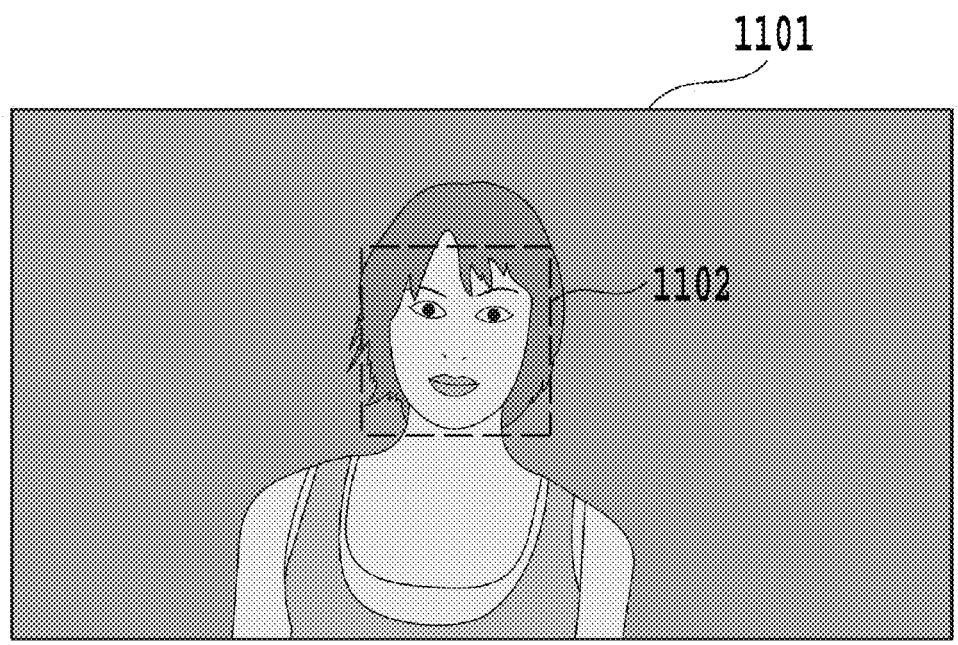
FIG. 11 is a diagram showing an example of transition between an image data and the detection result of the major subject.

FIG. 11 shows an image 1101 at a half-pushed state of the shutter in the input device 100.

As shown in FIG. 11, a face area 1102 obtained as a result of the face detection processing by the input device 100 has the same schematic position, but produces an angle shift to a face orientation.

Figure 12:
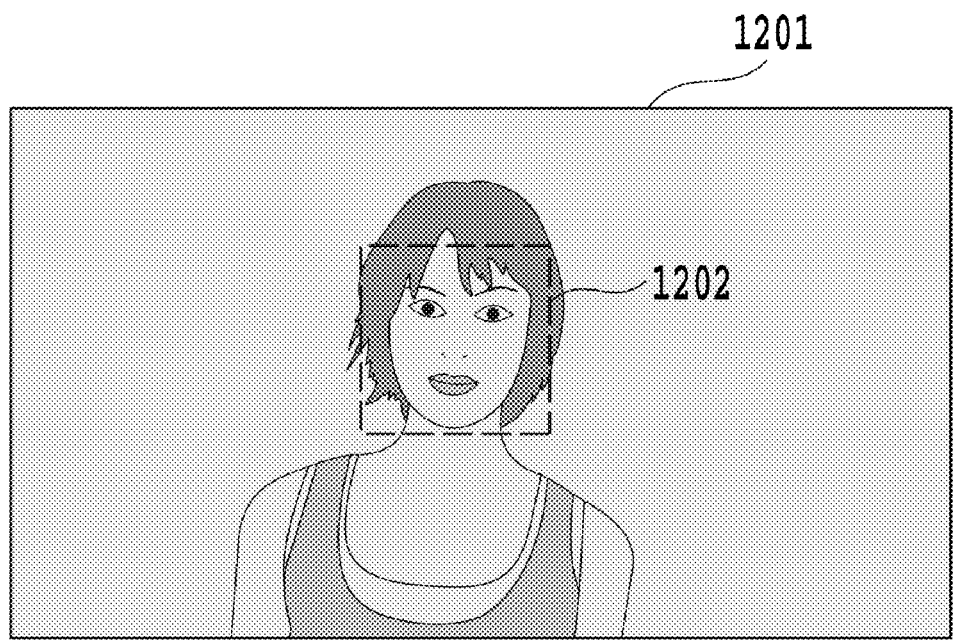
FIG. 12 is a diagram showing an example of transition between the image data and the detection result of the major subject.

FIG. 12 shows an image 1201 after the shutter in the input device 100 is pushed to photograph a face.

As shown in FIG. 12, a face area 1202 obtained as a result of the face detection processing by the input device 100 has the same coordinates as those in the face area 1102 in FIG. 11. However, the image 1201 is formed as the most appropriate image caused by an adjustment of the photography condition in the input device 100 and further, processing the image correction or the like.

That is, as shown in FIG. 11, the image is dark as a whole in a state before the photographing by the input device 100. On the other hand, as shown in FIG. 12, in a state after the photographing of the input device 100, the image is bright by an improvement of exposure and a shutter speed in the input device 100, a gain adjustment after the photographing and the like.

Figure 13:
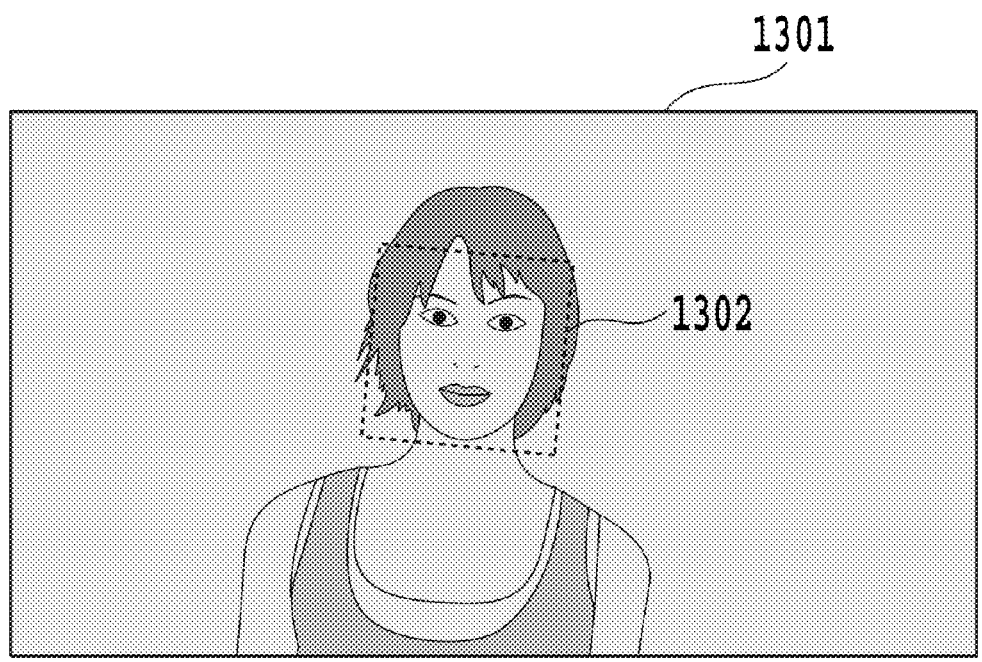
FIG. 13 is a diagram showing an example of transition between the image data and the detection result of the major subject.

FIG. 13 shows a face area 1302 obtained as a result of the face detection processing executed to an image data 1301 in the image processing apparatus 200.

In FIG. 13, the image data 1301 is the same as the image data 1201 in FIG. 12.

As shown in FIG. 13, it is found out that the face area 1302 obtained as a result of the face detection processing by the image processing apparatus 200 is different from the face area 1102 obtained as a result of the face detection processing before the photographing by the input device 100 in FIG. 11, and an accurate face detection is possible in the face area 1302.

That is, as shown also in FIG. 13, as a result of executing the face detection processing by the image processing apparatus 200, the face area 1302 in which an inclination of the face is also accurately detected is obtained.

In particular, the image data 1301 in FIG. 13 is photographed in a photography condition more suitable for a face as compared to that before photographing by the input device 100. Therefore, when detection of the face area is performed to the image data 1301 in the image processing apparatus 200, the detection of the face area is facilitated.

When the face is not detected at step S1006 as a result of the face detection by the image processing apparatus 200 at step S1005 in FIG. 10, the analysis at step S207 in FIG. 2 is completed and the process goes to step S208. When the face is detected by the image processing apparatus 200 at step S1006, the process goes to step S1007.

At step S1007, a result of the face detection processing by the input device 100 is compared with a result of the face detection processing by the image processing apparatus 200.

At step S1007, when it is judged at step S1002 that the face detection result by the input device 100 is not stored, only the result of the face detection processing by the image processing apparatus 200 is compared.

Figure 15:
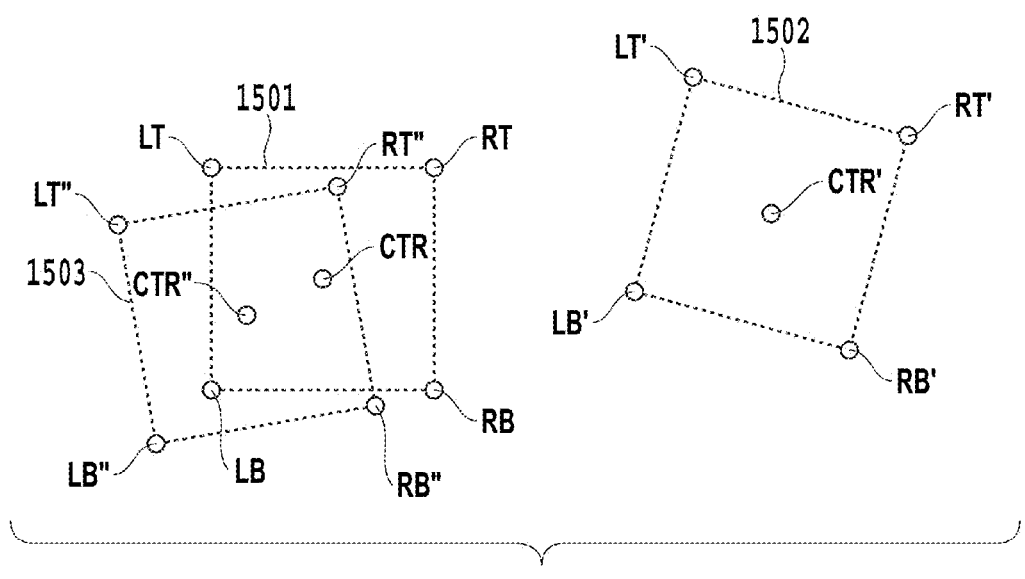
FIG. 15 is diagrams showing an example of comparison in position relation between face areas obtained as a result of face detection processing.
Figure 16:
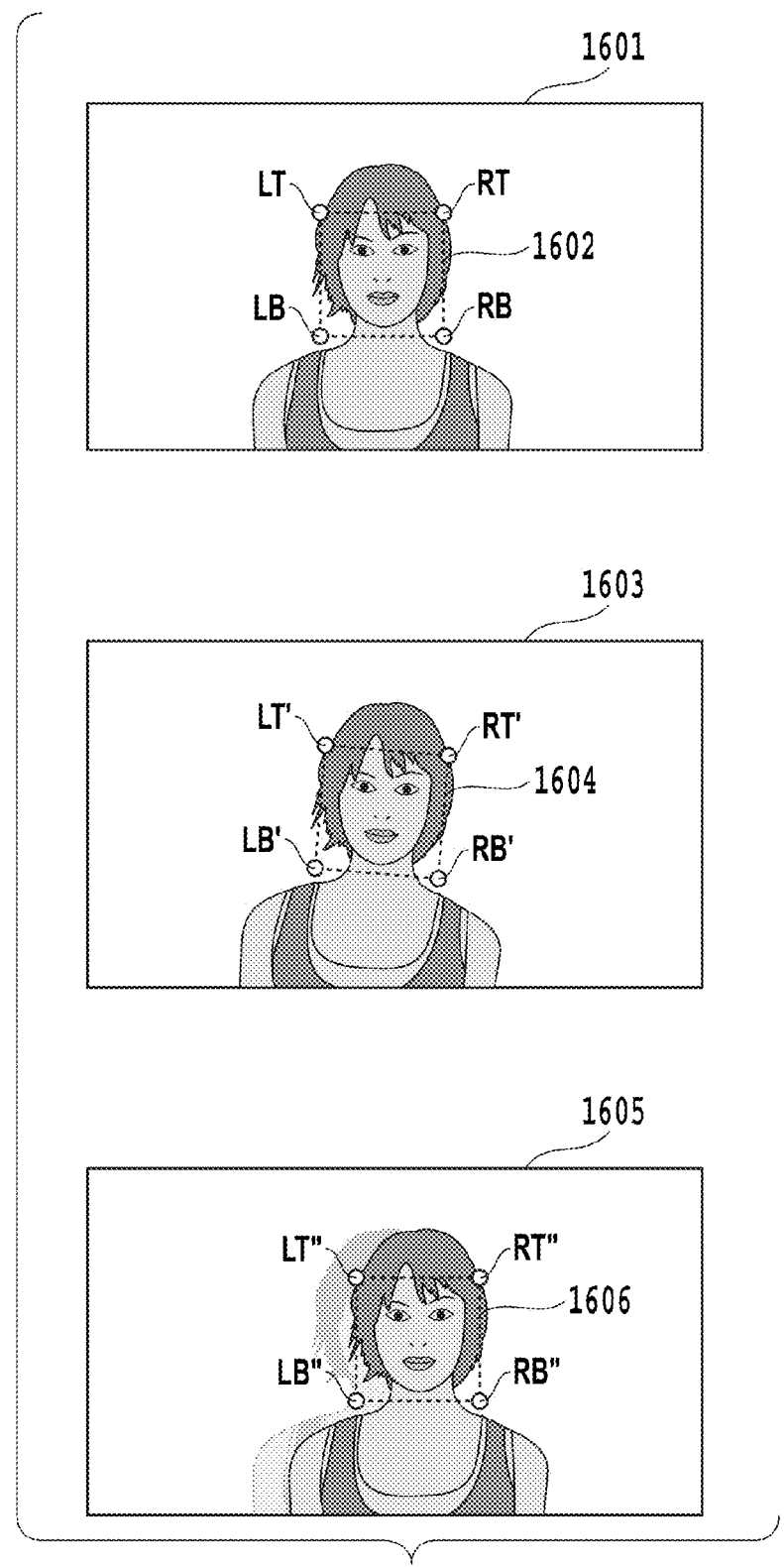
FIG. 16 is diagrams showing an example where the face areas are shifted from each other.

FIG. 15 shows an example of comparison in position relation between face areas obtained as a result of the face detection processing.

In FIG. 15, a face area 1501 is a reference face area. The face area 1501 may be a face area obtained as a result of the face detection processing by the input device 100 or a face area obtained as a result of the face detection processing by the image processing apparatus 200.

According to the face area 1501, the face area is calculated with coordinates of four points of left top (LT), right top (RT), left bottom (LB) and right bottom (RB), and a center point CTR as an intermediate point between two points at the opposing corners.

The judgment in a case where the face detection result is obtained with a position relation of a face area 1502 or a face area 1503 to the face area 1501 in FIG. 15 will be made as explained below by step S1008 and step S1009 in FIG. 10.

In FIG. 15, for example, the face area 1501 is obtained as a result of the face detection processing by the input device 100, and the face area 1502 and the face area 1503 are obtained as a result of the face detection processing by the image processing apparatus 200.

At step S1008, it is judged whether or not a combination of face areas existing in the vicinity of each other exists. When it is judged at step S1008 that the combination of the face areas existing in the vicinity of each other exists, the process goes to step S1009. When it is judged at step S1008 that the combination of the face areas existing in the vicinity of each other does not exist, the process goes to step S1011.

The judgment on the vicinity of the face area at step S1008 is made based upon whether to meet the condition that coordinates of a center CTR in one face area of a combination of the face areas are included in the other face area.

As a further additional condition, a condition whether or not an angle formed with line segment LT-RT and line segment LT'-RT' is within a predetermined range may be used at step S1008.

In a case where coordinates of the center CTR in one face area of the combination of the face areas are included in the other face area and the angle formed with line segment LT-RT and line segment LT'-RT' is within ±15 degrees, it may be judged at step S1008 that the face areas are in the vicinity of each other.

Based upon such a judgment, it is judged at step S1008 that the face area 1503 is in the vicinity of the face area 1501 and the face area 1502 is not in the vicinity of the face area 1501

Next, the judgment as to whether or not the face areas are in correspondence with each other is made at step S1009.

In a case where it is judged at step S1009 that the face areas are in correspondence with each other, the process goes to step S1012. On the other hand, in a case where it is judged at step S1009 that the face areas are not in correspondence with each other, the process goes to step S1010.

The judgment as to whether to compare a whole part of the face area is made at step S1012. When it is judged at step S1012 that the whole part of the face area is compared, the process goes to step S1013. On the other hand, when it is judged at step S1012 that the whole part of the face area is not compared, the process goes back to step S1007.

At step S1013 it is judged whether or not the face areas are in correspondence with each other or a combination of the face areas existing in the vicinity of each other exists. In a case where at step S1013 it is judged that the face areas are in correspondence with each other or the combination of the face areas existing in the vicinity of each other exists, the process ends. In a case where at step S1013 it is judged that the face areas are not in correspondence with each other and the combination of the face areas existing in the vicinity of each other does not exist, the process goes to step S1014.

At step S1014 the face coordinate data D202 is deleted.

At step S1009 the judgment condition may be more limited than the judgment condition used at step S1008. For example, at step S1009, a condition that a distance between the respective centers CTR and CTR' in a combination of the face areas is made to ½ or less of a length of line segment LT-RT may be used as the determination condition.

Further, for example, at step S1009 a condition that the length of line segment LT-RT is within a range of ½ to twice of the length of line segment LT'-RT' may be added to the judgment condition. In this way, it is possible to consider a size of the detection face area.

Conditions other than the above explained conditions may be used as the judgment condition at step S1008 or step S1009.

The judgments at step S1008 and step S1009 are made in all of the result of the face detection processing executed at step S1005 and the result of the face detection processing in the input device 100 stored at the face coordinate data D202. However, in a case where it is judged at step S1002 that the face detection result by the input device 100 is not stored, comparison in each judgment of step S1008 and step S1009 is made only to the result of the face detection processing executed at step S1005.

The face area which is not in the vicinity as the face detection result in the input device 100 at step S1008 is added to the face coordinate data D202 as a new face area at step S1011. As a result, the face area which can not be detected by the input device 100 can be added to the face coordinate data D202.

In a case where the face area judged to be in correspondence at step S1009 does not exist, the result of the face detection processing by the image processing apparatus 200 overwrites a value of the result of the face detection processing in the input device 100 at step S1010, and is stored in the face coordinate data D202. Therefore, a highly reliable face area detected by the image processing apparatus 200 can be stored in the face coordinate data D202.

When the processing of all the face detection results is completed, the analysis processing S207 is completed and the process goes to step S208.

At step S208, the face coordinate data D202 is used to make a correction to the image data read at step S206.

At step S208, in a case where the face coordinate data D202 does not exist, an image correction not using the face coordinate data D202 may be made.

In the image correction at step S208, the face coordinate data D202 is used to make a correction specified in a face.

For example, at step S208, the processing of correcting color information such as brightness, color appearance and chroma of a face area in such a manner as to be the most appropriate for a face may be executed.

In regard to the image correction with attention to a person, a method of an automatic correction as described below is proposed.

For example, Japanese Patent Laid-Open No. H6-121332 (1994) or Japanese Patent Laid-Open No. H11-146405 (1999) discloses a technology in which a flesh color area or an area of a face of a person is detected out of a video signal, and a brightness correction, a color correction and an aperture correction are made only in the detected area.

The invention of each of Japanese Patent Laid-Open No. H6-121332 (1994) and Japanese Patent Laid-Open No. H11-146405 (1999) performs area extraction based upon the flesh color detection as a determination method of the face detection and the correction area.

Japanese patent Laid-Open No. 2002-044469 discloses a technology in which a face of a person or a color in an area of a flesh is corrected to produce a natural color in a digital image data composed of a photo image including the face of the person or the area of the flesh and the entire image is also corrected in color to have a good color balance.

Japanese Patent Laid-Open No. 2004-303193 discloses a technology of a method in which, for detecting a face to make a correction only to a face area, a color component of a flesh is specified from the face area to make a correction only to the color component.

In reverse, there may be provided the processing in which a face area is bypass-filtered to sharpen a little bit blurred face area, thereby creating a clear face area.

Further, a pupil area photographed as a red eye may be detected from the detection face area to make a red-eye correction.

As described above, at step S208 various types of correction processing may be adopted by using the face area.

Figure 14:
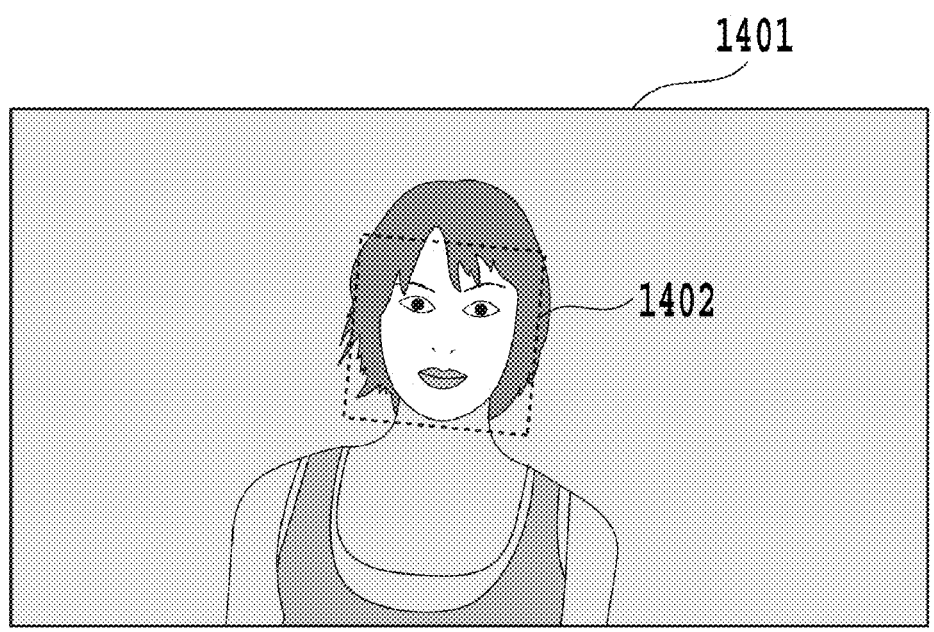
FIG. 14 is a diagram showing an example of transition between the image data and the detection result of the major subject.

Here, as shown in FIG. 14, there is assumed that a beauty-flesh correction of making a person's flesh look beautiful in an area limited to an inside (white area in FIG. 14) of a face area 1402 in an image data 1401 is made.

The image data corrected at step S208 is printed at step S209.

Until the print processing of the image selected at step S206 is completed, the processing from step S206 to step S209 is repeated.

That is, at step S210 it is judged whether or not the image processing is completed. In a case where at step S210 it is judged that the image processing is completed, the process goes to step S211, and in a case where at step S210 it is judged that the image processing is not completed, the process goes back to step S206.

At step S211, it is judged whether or not the face coordinate data detected by the image processing apparatus 200 is written back to the photography data to be stored.

In a case where at step S211 it is judged that the face coordinate data detected by the image processing apparatus 200 is not written back to the photography data to be stored, the output processing ends.

In a case where at step S211 it is judged that the face coordinate data detected by the image processing apparatus 200 is written back to the photography data to be stored, the process goes to step S212. The face coordinate data D202 is written in the maker original information items in the Exif file of the memory card 300 in which the photography data D201 is stored, and the process ends.

As described above, according to the present invention, in a case where the result of the face detection processing by the input device 100 is shifted from the result of the face detection processing by the image processing apparatus 200, the correction can be made by detecting an appropriate face area.

In the above embodiment, a low pass correction or a high pass correction may be made as limited to the area of the major subject as the correction.

In the present embodiment, plural image correction units may be used. In this case, the plural image correction units may be called "first image correction unit" and "second image correction unit".

The processing of the present embodiment as described above may be executed by the CPU 107 in the input device 100 or the CPU 201 in the image processing apparatus 200.

The present embodiment may be applied to a system including plural equipment (for example, PC host computer, interface equipment, reader and the like). In addition, in the present embodiment, the detection may be performed in each data before and after the photographing in the input device 100.

The present embodiment may be applied to a device composed of one unit (for example, copier, facsimile device or the like).

An object of the present invention is achieved by providing a storage medium (or print medium) which has recorded a program code of software performing the function of the aforementioned embodiment, to a system or a device. The object of the present invention is achieved by reading out and performing a program code stored in a storage medium by a computer without mentioning.

In this case, the program itself read out from the storage medium achieves the function of the aforementioned embodiment, and the storage medium storing the program code is included in the present invention.

By executing the program code read out by the computer, the function of the aforementioned embodiment is realized. Besides, an operating system (OS) working on a computer executes a part or all of the actual processing based upon an instruction of the program code. Also a case where the function of the aforementioned embodiment is realized by the processing using the operating system is included in the present invention without mentioning.

The program code read out from the storage medium is written in a function expansion card inserted into a computer or in a memory equipped in a function expansion unit connected to a computer. Thereafter, the CPU equipped in the function expansion card or in the function expansion unit executes a part or all of the actual processing based upon an instruction of the program code. A case where the function of the aforementioned embodiment is realized by the processing is also included in the present invention without mentioning.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166254, filed Jun. 25, 2008, which is hereby incorporated by reference herein in its entirety.

What is claimed is:

1. An image processing apparatus comprising:
   an inputting unit for inputting (a) a detection result of a major subject detected by an input device and (b) an image;
   a detecting unit for detecting a major subject in the image inputted by the inputting unit;
   a comparing unit for comparing the detection result of the major subject detected by the detecting unit with the detection result of the major subject inputted by the inputting unit; and
   a correcting unit for determining an area of a major subject in the image in accordance with the result of the comparison by the comparing unit to make a correction to the area of the major subject.

2. An image processing apparatus according to claim 1, wherein the comparison by the comparing unit is made by comparing whether or not the area of the major subject detected by the detecting unit and the area of the major subject inputted by the inputting unit are in the vicinity of each other.

3. An image processing apparatus according to claim 2, further comprising a storing unit for storing, into a memory unit, the detection result of the major subject inputted by the inputting unit, wherein in a case where the area of the major subject detected by the detecting unit and the area of the major subject inputted by the inputting unit are not in the vicinity of each other in the comparison by the comparing unit, the area of the major subject detected by the detecting unit is added to the area of the major subject stored in the storing unit.

4. An image processing apparatus according to claim 2, wherein the comparison by the comparing unit is made by comparing whether or not the detection result of the major subject detected by the detecting unit is in correspondence with the detection result of the major subject inputted by the inputting unit.

5. An image processing apparatus according to claim 1, further comprising a storing unit for storing, into a memory unit, the detection result of the major subject inputted by the inputting unit, wherein in a case where the area of the major subject detected by the detecting unit is in the vicinity and is not in correspondence with the area of the major subject inputted by the inputting unit in the comparison by the comparing unit, the area of the major subject detected by the detecting unit overwrites the area of the major subject stored in the storing unit, which is in the vicinity and is not in correspondence with the area of the major subject inputted by the inputting unit.

6. An image processing apparatus according to claim 1, wherein the major subject includes a face of a person.

7. An image processing apparatus according to claim 1, wherein the detection result of the major subject detected by the input device is stored in an Exif file of the image.

8. An image processing apparatus according to claim 1, wherein the correcting unit corrects brightness in the area of the major subject.

9. An image processing apparatus according to claim 1, wherein the correcting unit corrects a color balance in the area of the major subject.

10. An image processing apparatus according to claim 1, wherein the correcting unit makes a low pass correction to the area of the major subject.

11. An image processing apparatus according to claim 1, wherein the correcting unit makes a high pass correction to the area of the major subject.

12. An image processing method comprising:
a step of inputting, by an image processing apparatus, (a) a detection result of a major subject detected by an input device and (b) an image;
a detecting step of detecting, by the image processing apparatus, a major subject in the image inputted by the inputting step;
a comparing step of comparing the detection result of the major subject detected by the detecting step with the detection result of the major subject inputted by the inputting step; and
a correcting step of determining an area of a major subject in the image in accordance with the result of the comparison by the comparing step to make a correction to the area of the major subject.

13. An image processing method according to claim 12, wherein the comparison by the comparing step is made by comparing whether or not the area of the major subject detected by the detecting step and the area of the major subject inputted by the inputting step are in the vicinity of each other.

14. An image processing method according to claim 12, wherein the comparison by the comparing step is made by comparing whether or not the detection result of the major subject detected by the detecting step is in correspondence with the detection result of the major subject inputted by the inputting step.

15. A program storable in a non-transitory computer-readable storage medium for carrying out an image processing method by a computer, the image processing method comprising:
an inputting step of inputting, by an image processing apparatus, (a) a detection result of a major subject detected by an input device and (b) an image;
a detecting step of detecting, by the image processing apparatus, a major subject in the image inputted by the inputting step;
a comparing step of comparing the detection result of the major subject detected by the detecting step with the detection result of the major subject inputted by the inputting step; and
a correcting step of determining an area of a major subject in the image in accordance with the result of the comparison by the comparing step to make a correction to the area of the major subject.

16. A non-transitory computer-readable storage medium storing a program for carrying out an image processing method by a computer, the image processing method comprising:
an inputting step of inputting, by an image processing apparatus, (a) a detection result of a major subject detected by an input device and (b) an image;
a detecting step of detecting by the image processing apparatus, a major subject in the image inputted by the inputting step;
a comparing step of comparing the detection result of the major subject detected by the detecting step with the detection result of the major subject inputted by the inputting step; and
a correcting step of determining an area of a major subject in the image in accordance with the result of the comparison by the comparing step to make a correction to the area of the major subject.

* * * * *